Figure 1:
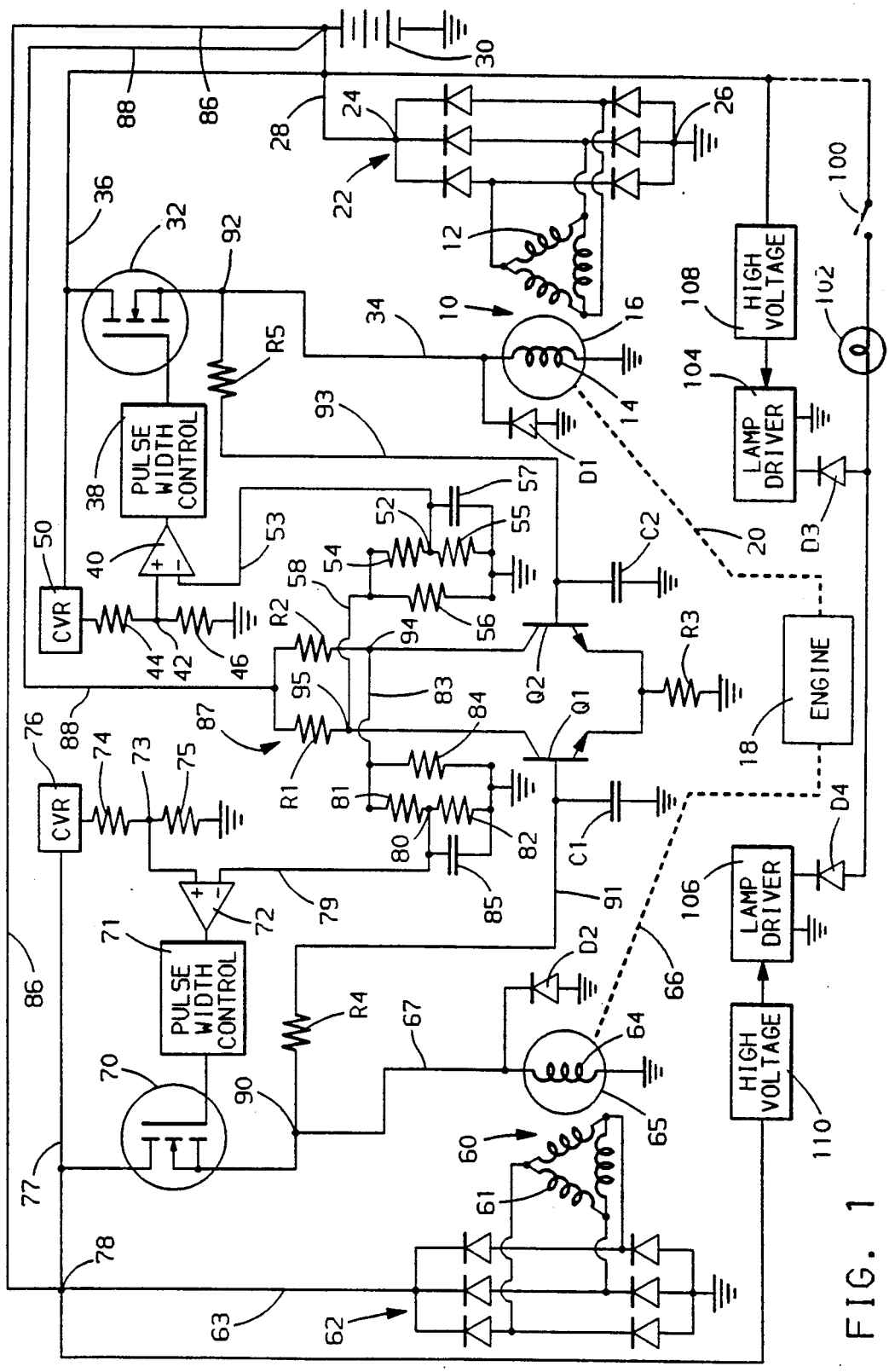

United States Patent [19]
Leaf et al.

[11] Patent Number: 5,254,936
[45] Date of Patent: Oct. 19, 1993

[54] DUAL GENERATOR ELECTRICAL SYSTEM

[75] Inventors: Larry J. Leaf; Jerald D. Luttrell, both of Anderson; Jack D. Harmon, Carmel, all of Ind.

[73] Assignees: General Motors Corporation, Detroit, Mich.; Delco Electronics Corp., Kokomo, Ind.

[21] Appl. No.: 944,379

[22] Filed: Sep. 14, 1992

[51] Int. Cl.⁵ ............................................... H02J 7/16
[52] U.S. Cl. ........................................ 322/90; 307/84; 322/94
[58] Field of Search ...................... 307/84; 322/90, 94, 322/89

[56] References Cited

U.S. PATENT DOCUMENTS

| | | | |
|---|---|---|---|
| 2,504,768 | 4/1950 | Watson et al. | 290/4 |
| 4,156,836 | 5/1979 | Wiley | 322/90 X |
| 4,336,485 | 6/1982 | Stroud | 320/15 |
| 4,347,473 | 8/1982 | Stroud | 320/15 |
| 4,509,005 | 4/1985 | Stroud | 320/68 |
| 4,539,515 | 9/1985 | Morishita et al. | 320/17 |
| 4,604,565 | 8/1986 | Yokota et al. | 320/15 |
| 4,636,706 | 1/1987 | Bowman et al. | 322/28 |
| 4,661,760 | 4/1987 | Goto et al. | 322/27 |
| 4,829,228 | 5/1989 | Buetemeister | 322/27 |

Primary Examiner—R. J. Hickey
Attorney, Agent, or Firm—Creighton R. Meland

[57] ABSTRACT

A motor vehicle power supply system for supplying current to the direct voltage loads on a motor vehicle. The system has two alternating generators which are driven by the engine of the motor vehicle. The output windings of the respective generators are connected to bridge rectifiers that supply current to a common motor vehicle direct current load. Each generator has a field winding and the current supplied to a respective field winding is controlled by a respective voltage regulator. The voltage regulators cause pulses of current to be supplied to the field windings. The system has a control circuit for controlling the pulse width of the current pulses supplied to the respective field windings such that the pulse width of the current pulses supplied to one field winding are substantially equal to the pulse width of the current pulses supplied to the other field winding.

9 Claims, 1 Drawing Sheet

DUAL GENERATOR ELECTRICAL SYSTEM

This invention relates to a dual generator system wherein a pair of generators supply current to a common electrical load.

The electrical power requirements of motor vehicles continue to increase as more electrical loads are added to the vehicle. A possible solution to providing sufficient electrical power is to use two generators that are connected in parallel and which supply the electrical loads on the vehicle. Dual generator systems are known, one example being the system disclosed in the U.S. Pat. No. 4,829,228 to Buetemeister.

The electrical system of this invention utilizes two generators that feed a common electrical load circuit. Each generator has a field winding and the system has two voltage regulators. One of the voltage regulators controls the field current of one of the generators and the other voltage regulator controls the field current of the other generator. Both voltage regulators operate to control the on-time or pulse width of current pulses that are supplied to the respective field windings. The system has a control circuit which senses the on-time or pulse width of the current pulses supplied to the field windings of the two generators and, in response to this information, operates to control the system such that the pulse width or on-time of the field current pulses for the two generators are controlled so as to be substantially equal. It, accordingly, is an object of this invention to provide a dual generator system which senses the pulse width of current pulses applied to the field windings of the generators and from this information, maintains the pulse width of the current pulses supplied to the field windings of the generators substantially equal.

Another object of this invention is to provide an electrical system of the type that has been described where the generators are driven by an engine of a motor vehicle and where the generators are alternating current generators connected to rectifying means and where the rectifying means supplies direct current to the direct current loads on a motor vehicle.

A further object of this invention is to provide an electrical system of the type where a control circuit is provided for sensing the pulse width of the current pulses that are supplied to the field windings of the generators, the control circuit comprising two capacitors which are respectively charged as a function of the pulse width of the respective current pulses.

IN THE DRAWINGS

The single FIGURE drawing is a schematic circuit diagram of an electrical system made in accordance with this invention.

In the description of this invention, it will be assumed that the motor vehicle power supply system to be described is a twelve volt system.

Referring now to the drawing, the reference numeral 10 designates an alternating current generator that is shown as having a three phase Delta-connected output or stator winding 12. The stator winding could be Wye-connected. The generator has a field winding 14 that is carried by the rotor 16 of the generator. The rotor 16 is driven by an engine 18 on a motor vehicle as illustrated by dotted line 20.

The output winding 12 is connected to a three phase full wave bridge rectifier 22 that is comprised of six diodes. The bridge rectifier 22 has a positive direct voltage output terminal or junction 24 and a negative direct voltage output terminal 26 that is connected to ground.

The positive terminal 24 is connected to a conductor 28. Conductor 28 is connected to the positive terminal of a storage battery 30. The negative terminal of battery 30 is grounded. The battery 30 is a twelve volt storage battery. The conductor 28 can feed the various direct voltage electrical loads (not illustrated) on a motor vehicle in a known manner.

The output voltage of generator 10 and hence the direct output voltage of bridge rectifier 22 is controlled by a voltage regulator which operates to maintain the output voltage of bridge rectifier 24 substantially constant. This voltage regulator is of the type disclosed in the U.S. Pat. No. 4,636,706, to Bowman et al., which is incorporated herein by reference. Thus, this voltage regulator comprises a field effect transistor 32 that has a source that is connected to one side of field winding 14 by conductor 34. The opposite side of field winding 14 is connected to ground. A field discharge diode D1 is connected across field winding 14.

The drain of transistor 32 is connected to a conductor 36 which, in turn, is connected to conductor 28. The gate of transistor 32 is connected to a pulse width control 38. Pulse width control 38 is connected to a voltage comparator 40. One input terminal of comparator 40 is connected to a constant reference voltage which is developed at junction 42 located between series connected resistors 44 and 46. These resistors are connected to a constant voltage regulator circuit 50 which develops a constant output voltage that is applied to resistors 44 and 46 from an input voltage on conductor 36. The other input terminal of comparator 40 is connected to a junction 52 by a conductor 53. Junction 52 is located between resistors 54 and 55. A resistor 56 is connected across resistors 54 and 55 and a capacitor 57 is connected across resistor 55. One end of resistors 55 and 56 are connected to ground and the opposite end of resistor 56 and one end of resistor 54 are connected to a conductor 58. The voltage at junction 52 is a function of the voltage on conductor 58.

The electrical system of this invention has another alternating current generator generally designated as 60. Generator 60 has a Delta-connected three phase output winding 61 that is connected to a three phase full wave bridge rectifier 62. The output or stator winding could be Wye-connected. The negative direct voltage output terminal of bridge rectifier 62 is connected to ground and its positive direct voltage output terminal is connected to conductor 63. Generator 60 has a field winding 64 carried by rotor 65 which is driven by engine 18 as indicated by dotted line 66. One side of field winding 64 is connected to ground and its opposite side is connected to conductor 67. A field discharge diode D2 is connected across field winding 64.

The output voltage of generator 60 is regulated by a voltage regulator which is the same as the one that has been described for regulating the output voltage of generator 10. This voltage regulator comprises a field effect transistor 70. The gate of transistor 70 is connected to a pulse width control 71. Control 71 is connected to voltage comparator 72. A constant reference voltage on junction 73 is applied to one input of comparator 72. This reference voltage is developed by resistors 74 and 75 and a constant voltage regulator 76 that develops a constant output voltage that is applied to resistors 74 and 75. The input of voltage regulator 76 is connected to conductor 77 which, in turn, is connected to junction 78.

The drain of transistor 70 is connected to conductor 63 via conductor 77 and junction 78. The source of transistor 70 is connected to one side of field winding 64 by conductor 67.

The other input of comparator 72 is connected to a conductor 79 which, in turn, is connected to junction 80. Junction 80 is connected between series connected resistors 81 and 82 that are series connected between conductor 83 and ground. A resistor 84 is connected across resistors 81 and 82 and a capacitor 85 is connected across resistor 82.

Both generators 10 and 60 supply current to the electrical loads on the motor vehicle including battery 30. Thus, current is supplied to battery 30 from bridge rectifier 22 via line 28. Current is supplied to battery 30 from bridge rectifier 62 via conductors 63 and 86.

The system of this invention has a control circuit generally designated as 87. This control circuit is a differential amplifier and is comprised of resistors R1, R2 and R3, NPN transistors Q1 and Q2 and capacitors C1 and C2. One end of resistors R1 and R2 are connected to a conductor 88 which is connected to the positive terminal of battery 30. The opposite ends of resistors R1 and R2 are respectively connected to the collectors of transistors Q1 and Q2. The emitters of transistors Q1 and Q2 are connected to one side of resistor R3. The opposite side of resistor R3 is connected to ground. Capacitor C1 is connected between the base of transistor Q1 and ground and capacitor C2 is connected between the base of transistor Q2 and ground. The voltage across battery 30 is applied to control circuit 87 between conductor 88 and ground. In a twelve volt system, by way of example and not by way of limitation, capacitors C1 and C2 may have a capacitance of one microfarad, resistors R1 and R2 may have a resistance of 1500 ohms and resistor R3 may have a resistance of 33,000 ohms. Transistors Q1 and Q2 may be type 2N3904-transistors or equivalent. Resistors 54 and 81 may be 68K ohms. Resistors 56 and 84 may be 8K ohms. Resistors 55 and 82 may be 35K ohms.

The base of transistor Q1 is connected to junction 90 on conductor 67 through a conductor 91 and a 10K ohm resistor R4. The voltage on conductor 91 therefore follows the voltage on conductor 67 and this voltage goes high and low as transistor 70 switches on and off in a manner to be described.

The base of transistor Q2 is connected to junction 92 on conductor 34 by a conductor 93 and a 10K ohm resistor R5. The voltage on conductor 93 follows the voltage on conductor 34 and this voltage goes high and low as transistor 32 switches on and off in a manner to be described.

The conductor 83 is connected to a junction 94 that is between resistor R2 and the collector of transistor Q2. The conductor 58 is connected to a junction 95 that is between resistor R1 and the collector of transistor Q2.

The operation of the system, as thus far described, will now be described. The two voltage regulators that are used in this system operate in the same manner. Considering the voltage regulator that controls the field current for field winding 14 of generator 10, the field effect transistor 32 is switched on and off at a fixed frequency and variable duty cycle. Putting it another way, the pulse width or the on-time period of transistor 32 is varied and the consecutive on-times of transistor 32 occur at a constant frequency. In this regard, when the voltage on conductor 53 that is connected to comparator 40 is below the reference voltage on junction 42, the transistor 32 is switched on and off at a constant frequency and variable on-time or duty cycle. When the voltage on conductor 53 exceeds the reference voltage, the transistor 32 is biased off or nonconductive. This is explained in more detail in the above-referenced Bowman et al. patent.

The on-time of transistor 32, which corresponds to the time period that field winding 14 is energized varies as a function of the voltage between conductor 28 and ground. Thus, assuming a twelve voltage system, the two voltage regulators that are used tend to maintain the voltage at the positive terminal of battery 30 at, for example, fourteen volts. In this regard, it can be seen that conductor 88 senses the voltage at the positive terminal of battery 30 and applies this voltage to the control circuit 87. Therefore, the voltages at junctions 52 and 80 follow the voltage at the positive terminal of battery 30 as modified by the operation of control circuit 87.

As transistor 32 switches on and off, a square wave voltage is developed at junction 92 that is applied to the base of Q2 and capacitor C2. This voltage goes substantially to zero when transistor 32 is biased off and goes to a high level when transistor 32 is biased on. The high-time period of this square wave corresponds to the time periods that field coil 14 is energized. What has just been described applies to junction 90; that is, a square wave voltage is developed on junction 90 as transistor 70 switches on and off. This square wave voltage is applied to the base of transistor Q1 and capacitor C1.

Let it be assumed that generator 60 has a higher output current than generator 10 and that the on-time of transistor 70 is greater than the on-time of transistor 32. Under this assumed condition, the square wave voltage on junction 90 will charge capacitor C1 to a higher voltage than the voltage to which capacitor C2 is charged. Thus, the respective capacitor C1 or C2 will attain a voltage that is related to the on-time of a respective transistor 70 or 32. Since the on-time of transistor 70 is greater than the on-time of transistor 32, the capacitor C1 attains a higher voltage than the voltage on C2.

It can be seen that the base voltage, of Q1 depends on the voltage on capacitor C1 and the base voltage on Q2, depends on the voltage on capacitor C2. Further, as the voltage applied to the base of a given transistor Q1 or Q2 increases, its collector current will increase and as base voltage decreases collector current will decrease.

As the collector current of Q1 increases, the current through resistors R1 and R3 increases. The effect is twofold. First, the higher current through resistor R1 increases the voltage drop across R1, thus lowering the voltage at junction 95 and conductor 58. Accordingly, the voltage at junction 52 will be lowered. Since junction 52 is connected to one input of comparator 40 through conductor 53 the voltage at the input of the comparator decreases. This has the effect of causing the pulse width or on-time of transistor 32 to increase, thereby increasing the average field current of field winding 14 to increase the output of generator 10.

The second effect is that the increase in current through resistor R3 increases the voltage drop across R3, thus raising the emitter voltage of transistor Q2. If the base voltage of transistor Q2 remains the same, an increase in emitter voltage will cause the collector current of Q2 to decrease. When the collector current of transistor Q2 decreases, the current through resistor R2 decreases. Lower current through R2 reduces the voltage drop across R2 thus increasing the voltage at junction 94. Increased voltage at junction 94 causes the voltage at junction 80 and conductor 79 to increase. This increasing voltage, applied to an input of comparator 72 from conductor 79 has the effect of decreasing the on-time or pulse width of transistor 70 thereby reducing the average field current supplied to field winding 64. This reduces the output of generator 60.

As the pulse width of the field current of field winding 14 increases, the average voltage of capacitor C2 increases thereby increasing the base voltage of Q2. This causes the collector current of Q2 to increase. As the collector current of transistor Q2 increases, the current through resistors R2 and R3 increases. The effect of this is twofold. First, higher current through resistor R2 lowers the voltage at junction 94 thereby lowering the voltage at junction 80 and conductor 79. This has the effect of increasing the pulse width of the field current for field winding 64 of generator 60, thereby increasing the output of generator 60.

The second effect, that is, a higher current through R3 raises the emitter voltage of transistor Q1. If the base voltage of Q1 remains the same, an increase in emitter voltage will cause Q1 to conduct less collector current. When the collector current of Q1 decreases, the current through R1 decreases. This reduces the voltage drop across R1 thereby causing the voltage at junction 95 and conductor 58 to increase. This causes the voltage at junction 52 and conductor 53 to increase with the result that the on-time or pulse width of the field current in field winding 14 decreases to thereby reduce the output of generator 10.

It can be appreciated from the foregoing that the control circuit 87 operates to equalize the on-time or pulse width of the current pulses supplied to the is field windings 14 and 64 to thereby equalize the outputs of generators 10 and 60. Putting it another way, control circuit 87 causes the two alternators to seek, and operate at, an equilibrium by forcing each voltage regulator to supply the same average field current to the respective field windings 14 and 64.

The electrical system of this invention includes means for indicating an excessively high voltage output of either alternator. To this end, an ignition switch 100 is provided that is connected to signal lamp 102. Lamp 102 is connected to lamp drivers 104 and 106 through respective diodes D3 and D4. A high voltage detector 108 is connected to bridge rectifier 22. When the output voltage of bridge rectifier 22 goes above a predetermined excessive high value, the high voltage detector 108 actuates lamp driver 104 to a conductive condition to thereby energize lamp 102. In a similar fashion, if the output voltage of bridge rectifier 62 goes above a predetermined excessive high voltage, the high voltage detector 110 that is connected to bridge rectifier 62 actuates lamp driver 106 to a conductive condition to thereby energize lamp 102.

It is pointed out that in the practice of this invention, the alternating current generators 10 and 60 may have different output ratings. Further, the rotors of these generators may be driven at different speeds.

The embodiments of the invention in which an exclusive property or privilege is claimed are defined as follows:

1. A dual generator electrical system for providing electrical current to an electrical load comprising, a first generator having a first output winding and a first field winding, a second generator having a second output winding and a second field winding, an electrical load, means connecting said output windings to said electrical load, means for supplying a series of first current pulses to said first field winding that have a controlled pulse width comprising a first voltage regulator connected to said first field winding, means for supplying a series of second current pulses to said second field winding that have a controlled pulse width comprising a second voltage regulator connected to said second field winding, means for developing a first control signal that is a function of the pulse width of said first series of current pulses, means for developing a second control signal that is a function of the pulse width of said second series of current pulses, and means responsive to said first and second control signals operative to cause the pulse widths of said first and second current pulses to be substantially equal.

2. The electrical system according to claim 1 where said generators are alternating current generators and where the output windings of said generators are connected to respective rectifying means that supply direct current to said electrical load.

3. The electrical system according to claim 1 where said means for developing said first control signal comprises a first capacitor and where said means for developing said second control signal comprises a second capacitor.

4. The electrical system according to claim 1 were said generators are alternating current generators and where the output windings of said generators are connected to respective rectifying means that supply direct current to said electrical load, said generators being driven by an engine on a motor vehicle.

5. The electrical system according to claim 1 where each said voltage regulator has a semiconductor switch means connected in series with a respective field winding.

6. A motor vehicle power supply system comprising, a first alternating current generator having a first polyphase output winding and a first field winding, a first bridge rectifier connected to said first output winding having direct voltage output terminals, a second alternating current generator having a second polyphase output winding and a second field winding, a second bridge rectifier connected to said second output winding having direct voltage output terminals, a direct voltage load, means connecting said direct voltage output terminals of said first and second bridge rectifiers to said direct voltage electrical load, means for supplying a series of first current pulses to said first field winding that have a controlled pulse width comprising a first voltage regulator connected to said first field winding, said first voltage regulator being connected to sense the voltage across said direct voltage load, means for supplying a series of second current pulses to said second field winding that have a controlled pulse width comprising a second voltage regulator connected to said second field winding, said second voltage regulator being connected to sense the voltage across said direct voltage load, means for developing a first control signal that is a function of the pulse width of said first series of current pulses, means for developing a second signal that is a function of the pulse width of said second series of current pulses, and means responsive to said first and second control signals operative to cause the pulse widths of said first and second current pulses to be substantially equal.

7. The electrical system according to claim 6 where said first and second generators are driven by an engine on said vehicle.

8. The electrical system according to claim 6 where said means for developing said first control signal comprises a first capacitor and where said means for developing said second control signal comprises a second capacitor.

9. The electrical system according to claim 6 where each said voltage regulator has a semiconductor switch means connected in series with a respective field winding.

* * * * *